US008698634B2

(12) United States Patent
Guedes Lopes Da Fonseca et al.

(10) Patent No.: US 8,698,634 B2
(45) Date of Patent: Apr. 15, 2014

(54) INTEGRATED SYSTEM FOR MULTICHANNEL MONITORING AND COMMUNICATION IN THE MANAGEMENT OF RESCUE TEAMS

(75) Inventors: Tiago Bénard Guedes Lopes Da Fonseca, Lisboa (PT); Pedro Miguel Henriques Matos, Linda-a-Velha (PT); Miguel Nuno Da Silva Leal Rios, Lisboa (PT); Nuno Miguel Gonçalves Borges Carvalho, Lisboa (PT); Pedro Miguel Ferreira Claro, Lisboa (PT); Mário Rui Santos, Lisboa (PT); José Miguel Rodrigues Remédio, Barcelona (ES); Antão Bastos Carriço Vaz De Almada, Lisboa (PT); Bruno Miguel Santos Serras, Santo António dos Cavaleiros (PT); David José Matos Palma, Almada (PT); Ivan De Almeida Soares Franco, Almada (PT)

(73) Assignee: Ydreams—Informatica, S.A., Aveiro (PT)

( * ) Notice: Subject to any disclaimer, the term of this patent is extended or adjusted under 35 U.S.C. 154(b) by 1418 days.

(21) Appl. No.: 12/164,933

(22) Filed: Jun. 30, 2008

(65) Prior Publication Data
US 2009/0313748 A1 Dec. 24, 2009

(30) Foreign Application Priority Data
Jun. 23, 2008 (EP) .................................. 08398008

(51) Int. Cl.
*G08B 23/00* (2006.01)

(52) U.S. Cl.
USPC ................... 340/573.1; 340/584; 340/539.13; 340/539.12

(58) Field of Classification Search
USPC ....................................... 340/500, 540, 573.1
See application file for complete search history.

(56) References Cited

U.S. PATENT DOCUMENTS

| 5,973,602 | A | * | 10/1999 | Cole et al. ..................... 340/584 |
| 6,108,197 | A | | 8/2000 | Janik |
| 6,201,475 | B1 | | 3/2001 | Stumberg et al. |
| 6,243,870 | B1 | | 6/2001 | Graber |
| 6,381,482 | B1 | | 4/2002 | Jayaraman et al. |

(Continued)

FOREIGN PATENT DOCUMENTS

JP 2003-256963 A 9/2003

*Primary Examiner* — Brian Zimmerman
*Assistant Examiner* — Sara Samson
(74) *Attorney, Agent, or Firm* — King & Spalding L.L.P.

(57) ABSTRACT

An integrated monitoring and multichannel communication system for the management of rescue teams, especially those fighting forest fires, comprises a suit, worn by a rescue worker; an electronic system; a telecommunication system; and an information system. The suit integrates fireproof, waterproof, heatproof and impact resistant materials to integrate, protect and allow access to the electronic system. The electronic system collects biometric and location data from the rescue worker, transmitting said data to a panel located in the back of the suit. The telecommunications system sends the biometric, orientation and location data, in real-time through an Ultra High Frequency network, to a computer integrated into a support vehicle, which in its turn sends the data to a server. The information system collects and manages the data to monitor the biometric, orientation and location data, to receive critical alerts and through maps to define deployment strategies for the rescue worker.

1 Claim, 14 Drawing Sheets

(56) References Cited

U.S. PATENT DOCUMENTS

| | | |
|---|---|---|
| 6,507,486 B2 | 1/2003 | Peterson, III |
| 6,509,830 B1 * | 1/2003 | Elliott ...................... 340/286.02 |
| 6,563,424 B1 | 5/2003 | Kaario |
| 6,834,436 B2 * | 12/2004 | Townsend et al. ............... 33/512 |
| 6,930,608 B2 * | 8/2005 | Grajales et al. ............ 340/573.5 |
| 7,167,715 B2 * | 1/2007 | Stanforth ...................... 455/457 |
| 7,737,850 B2 * | 6/2010 | Malik ........................ 340/572.1 |
| 2003/0122655 A1 * | 7/2003 | Hum et al. .................... 340/10.3 |
| 2003/0158635 A1 | 8/2003 | Pillar et al. |
| 2004/0008116 A1 * | 1/2004 | Goehring ................... 340/573.1 |
| 2004/0039510 A1 | 2/2004 | Archer et al. |
| 2006/0023681 A1 * | 2/2006 | A'Rafat ........................ 370/338 |
| 2006/0125623 A1 * | 6/2006 | Appelt et al. ................. 340/521 |
| 2007/0229286 A1 * | 10/2007 | Huang ...................... 340/573.1 |
| 2009/0005102 A1 * | 1/2009 | Das et al. ...................... 455/522 |

* cited by examiner

INTEGRATED SYSTEM FOR MULTICHANNEL MONITORING AND COMMUNICATION IN THE MANAGEMENT OF RESCUE TEAMS

FIELD OF INVENTION

The present invention refers generically to technological systems to support emergency control and catastrophe management.

The present invention relies in a forest fire monitoring system, based on an integrated system for monitoring biometric data and location information, and structures of multiplexed communication.

PRIOR ART

Operations in emergency and catastrophic scenarios are frequently limited by the lack of control ability of the full rescue efforts, as well as by various problems in communication networks which, in these situations, are of critical importance. These limitations affect also the availability of operational information, which is all the most critical is situations of urgency, and which cripple the ability to formulate and adequate reply. In the context of the present invention, forest fire fighting is a central concern.

A global management of the theatre of operation implies several levels, from constant communication to the correction attribution of heterogenic resources.

In forest fire fighting operations, recurring casualties and the rapid degradation of means and equipment have determined our attention to this topic and to the development of a novel system capable of anticipating such situations and of surpassing current state of the art restrictions.

The development of the present invention is grounded in the necessity for a system which would provide the updating of relevant information about the possible points of intervention in forest fire scenarios, from the location of the different resources at issue to the vital state of the operational units.

It is determinant to know where in the terrain, all of the operational units are placed, to enable rapid action in replacing and repositioning teams in the terrain, when necessary.

In these scenarios of emergency and catastrophe during forest fire fighting, there is no room for limitations in communication. Human Resource Management in the scenario must be guided so that all participants in the operation are in contact, from the intervention teams in the operation theatre to the coordinators in the central. Satellite communications, in particular, are immune to factors that disrupt terrestrial communication infrastructures, such as destruction of support system or network saturation, caused by usage peaks in emergency situations.

There exist not alternatives that manage to satisfy these needs in an integrated manner and thus guarantee the global control of all operations in fighting forest fires, in situations of emergency and catastrophe. The present invention patches fills this void though a novel system which effectively integrates technical solutions on communication, location and biometric monitoring of operational units.

The patents and references quoted as state of the art of the present invention are a starting point.

However, in the implementation of the present invention a new system is disclosed, which possesses characteristics decurring from its integration of diverse components, which as a whole bring unique value in regard to the function of system, which is not to be found in other systems.

U.S. Pat. No. 6,108,197 by Janik, Craig M, describes a modular computer device, which can be integrated into a piece of clothing. The connections between the modules can be made via flexible circuits, with the communication with additional peripherals being done via wireless communications. The present version extends the concept to a suit with fire-proof fabrics which integrate sensors to monitor vital signs, position of the torso and limbs, and orientation and location of operational units. The present invention further integrates a module of alerts with the capacity to analyze data from sensors and warn the operational unit about the possibility of a critical situation. The present invention further integrates additional modules which allow for the analysis and monitoring of the operational actions, adding information regarding terrain maps or other data which allow for a better analysis of the emergency situation. The present invention integrates still procedures to calibrate the various sensors of the suit, as well as adding a module to communicate with the operational unit's suit, warning about an emergency situation outside the suit's electronic system detection routines.

U.S. Pat. No. 6,201,475, by Stumberg et al, describes a system which allows a fire department to monitor a series of security parameters during a fire fighting operation, by audio and/or visual means. The system allows the monitoring of pressures levels in the breathing cycle, environmental temperature and motion of the fire-fighter, by sensors integrated in the fire-fighter's suit. The activation of an alarm system occurs when the oxygen levels diminish, indicating a potential emergency situation, namely an imminent thermal increase or the lack of motion of the fire-fighter. The present invention extends the concept introduced in this patent via the incorporation of fire-proof fabric which allows the mobility of the operational unit and which integrates sensors capable of monitoring the vital signs of the operational unit, as well as its location, verticality and position of the torso and limbs. The analysis of these elements allows for a significantly better comprehension of the activities and heath status of the operational units, this data being transmitted to the other modules of the system, which add this information to another type of information, namely maps, thus allowing for a better utilization of the resources allocated to an emergency situation. The present invention further focuses in a communication system which, using various channels, is specifically habilitated to operate in catastrophic scenarios.

U.S. Pat. No. 6,381,482, by Jayaraman Sundaresan and Park Sungmee, describes a textile in various shapes that includes a flexible information infra-structure to collect, process, transmit and receive information regarding the user of the textile. The textile allows for a new way of installing data processing devices about the user, by simply selecting and connecting sensors to the textile, creating a mobile information infra-structure which one can wear, operating in stand-alone mode or as a network. The textile can integrate various sensors capable of monitoring the user's vital signs. Furthermore, the connections can be made with textile fibres in optical strings.

The present invention extends this concept to fireproof suits to be used by fire fighting operationals in emergency situations to fight forest fires. The suits include sensors to analyse and monitor the location, orientation and position of the operational units' limbs. The present invention further includes a system to analyse data received from the sensors and warns the operational unit when it is in a situation of danger. Furthermore, the collected information is sent to the remaining modules of the system allowing for a better analysis of the data and communicating dangerous situations to the operational unit that it cannot detect autonomously or objectively.

U.S. Pat. No. 6,507,486, by Peterson Frederick A, III, describes an improvement of personal protection clothing. The system integrates a Personal Computer which is carried in and protected by pieces of clothing.

The present invention extends this concept with the integration of sensors capable of monitoring vital signs, location and orientation of operational units in emergency or catastrophic situations, as well as being able to analyze the verticality of the torso and the limbs of the operational unit. The sensors are integrated in a suit composed of fireproof layers, thus guaranteeing the comfort and mobility of the operational unit. Data is collected and transmitted to the remaining systems. The present invention further integrates an alarm module which notifies the operational unit about potentially dangerous situations.

U.S. Pat. No. 6,522,531, by Quintana et al., describes a system or method for utilizing a computer integrated in the clothing that utilizes a camera, a monitor, a protection panel, a battery, a protection box for the battery and a support for the computer and the battery, protecting the user from theses components. The present invention describes a suit with an integrated electronic system, capable of reading and analysing the values of the sensors part of the electronic system for monitoring the actions undertaken by an operational unit, and not resorting to a Personal Computer integrated into the suit.

U.S. Pat. No. 6,243,870, by Graber Geoff, describes a suit that incorporates energy links, cable structures and connection points for auxiliary devices associated with a mobile device which can be integrated with the suit. The cabling includes a waterproof protection layer and is enveloped in special textile which, in 2 or more layers, protects the user from electromagnetic radiation from the cables.

The present invention extends the concept to a suit made of fireproof textile which safeguards the user, the system and associated sensors. The suit was designed to allow for unhindered mobility and comfort to an operational unit, in its utilization, further allowing the monitoring of vital signs, location and orientation of the operational in situations of emergency or catastrophe, as well as verticality of the torso and limb position of the operational unit.

U.S. Pat. No. 6,108,197, by Janik Craig, describes a mobile device integrated in clothing which includes computational components and a flexible circuit which relays information between the modules. The modules can encompass a superior and inferior part. The flexible circuit connects the superior and inferior part, and between them there can exist a wireless connection.

The present invention extends the concept for a suit built with fireproof textiles which integrates various sensors and an electronic system capable of analyzing and monitor the values of the referred sensors. The cabling which links the electronic system to the sensors is integrated in the suit, extending between the upper limbs, torso and lower limbs of an operational unit. The present invention further allows the transmission of data collected by the sensors, through wireless networking, to a support vehicle.

US Patent Application 2004039510, by Archer Davic and Pillar Dua, describes an aeroplane for combating fires which integrates a chassis, a cabin and a control system. The control system further integrates several devices for input and output, interfaces and communication networking. Additionally, the interfaces which integrate the system are dispersed through the aeroplane and connected to the input and output devices. The output devices are controlled based in commands received by the input devices.

The present invention integrates a system for management of the operational fire fighting units, its scope not encompassing any direct fire fighting means.

Japanese Patent Application 2003256963, by Umekita Taisuke and Shinya Motohiro, describes an information system for supporting the combat in emergency and catastrophic situations. The system allows the sharing of information between an emergency central and different fire squads' headquarters. The system functions in sharing an initial report, instructions for fire fighting and support to activity on the ground.

The present invention extends the system of information which integrates ground activity support in the operational central, as well as in the support vehicles and operational unit level. The system monitors the vital signs, location and orientation of the operational in situations of emergency or catastrophe, as well as the verticality of the torso and limb position of the operational allowing decision makers to adopt fully conscious techniques or methods in view of the characteristics of the emergency/catastrophic situation.

US Patent Application 2003158635, by Pillar Duane and Squires Bradley, describes a method for information acquisition in a fire situation. The method comprises a sensor connected to a computer. The initial computer connects to a second computer in a fire-fighting vehicle and information referring to data collected by the sensor is displayed.

The present invention extends the concept to an electronic device and sensors built in a suit made from fireproof textiles. The suit has the capacity to monitor vital signs, location and orientation of an operational unit in emergency or catastrophic situations, as well the verticality of the torso and position of the limbs of the operational unit. This information is analyzed and monitored by the electronic system, and alerts can be triggered regarding eventual danger situations. The information is then sent to a support vehicle.

U.S. Pat. No. 6,563,424, by Kaario Juha, describes na intelligent suit that includes a passive communication system. The passive communication system includes cabling which allows for the connection of several devices to different places of the suit.

The present invention devises a suit with an electronic system and connection to a set of sensors which enable the monitoring of data received from each of the sensors. The system further extends the concept to allow the emission of alerts based on the values received by the sensors, values which are also sent to a support vehicle through a wireless connection.

In the present invention, the suit is composed by pants, a vest and a coat. The design of the suit was based in security, functionality and visibility requirements. The security requirements were achieved by selecting fireproof materials, and which are resistant to extreme conditions of heat, impact and humidity. The correct selection of materials allowed also to improve the functionality of the suit, maximizing comfort and favouring mobility. High visibility reflective materials were integrated in the suit to allow the rapid localization of the operational suited units on the terrain. The integrated protection that these joint factors provide the operational suited unit not only to safeguard its integrity, but also increases its efficiency. The additional weight and the complexity of the electronic system were also considered in their integration with the suit, so as not to compromise the comfort and mobility of the operational suited units.

The infra-structure of sensors, data collection and processing is imbued in the suit. The data collected by the different sensors built in the suit are transmitted by the different sensors to a panel located in the back of the suit. The data is then processed and transmitted though an Ultra High Frequency modem to a computer in a support vehicle. The computer in the vehicle then transmits the data to the operations central, automatically selecting the best communication channel, from satellite or General Packet Radio Service (GPRS) over Global System for Mobile Communications (GSM). Factors as availability, costs and bandwidth are taking into account in this process. Terrestrial technologies such as GPRS/GSM provide for more bandwidth. However, in the cases that terrestrial communications are not possible, satellite communication guarantees the transference of all data between the terrain and the operations central which processes said data. The information is also sent via Wi-Fi from the support vehicle to wireless device.

The set of sensors in the suit allow for the collecting and monitoring of location, orientation, limb position, torso inclination, body temperature and heart rate of the operational suited unit. Location is obtained through a global positioning system integrated in the suit. Verticality is obtained an inclinometer which determines the position of the operational suited unit's torso in relation to the ground. To each sleeve of the suit, there was integrated an inclinometer which determines the inclination of each limb in relation to the torso.

Additionally, the suit integrates resistive sensors with the function of monitoring the angle in the joints of the arms and the legs. The suit further includes sensors to monitor air temperature, allowing to infer the degree of risk in the exposure of the operational suited units to high temperatures, as well as sensors in the forearms to caption the heart rate of the operational suited units. The suit also includes an integrated cord that allows the operational suited unit to trigger an alarm, and to signal a dangerous situation.

The information system is comprised of various subsystems: one directly integrated in the electronic system of the suit; another integrated in the computer in the support vehicle; another installed in the wireless device; and still another integrated in the server. The suit integrated subsystem has as function to collect the data from the various electronic components, process the data, transmit it via the Ultra High Frequency modem and detect dangerous situations if the values exceed respective thresholds, triggering an alarm through the loudspeaker included in the suit, when the values exceed a pre-defined threshold. This alert module guarantees a pro-active action-reaction process in the immediate assistance to the operational suited units and in the consequent redefinition of terrain deployment strategies. The support vehicle subsystem has as function to collect data sent by the suit-integrated subsystem and by the wireless device subsystem and sends them by TCP/IP over GPRS/GSM or satellite to the server subsystem. The support vehicle subsystem further integrates, for increased data access speed, a temporary memory, allowing the wireless device subsystem to access in real-time the data most frequently accessed, e.g. terrain maps. The support vehicle may function autonomously in terms of map databases.

The wireless subsystem allows for the visualization of terrain maps with the location of the operational suited units and of the support vehicles as well as biometric data for each operational suited unit; it also allows the triggering and reception of alarms from each of the operational suited units. This subsystem allows further allows the coordinating units to trade text messages. The server subsystem integrated in the central server functions to store in a central database all collected data and to deliver messages, further integrating a map server which supports the wireless device subsystem. The collected data are location-tagged allowing the visualization of the data in their respective location.

The above features provide the invention with a set of technical advantages which arise from the fact of an innovate system being developed, with the capacity to respond to real necessities in emergency and catastrophe control in combating forest fires. Besides, the risk generally associated to any emergency operation is high, in environment where errors can be deadly. The present invention has as objective to increase the operational level in emergency situations and at the same time to increase the security of the operational suited units.

A major technical advantage is the possibility of knowing, in real-time, the location and orientation of each operational suited unit, as well of the support vehicles, thus allowing a better knowledge of the operation scenario, and therefore a more effective response in resolving emergencies or catastrophes.

Another technical advantage is the monitoring of vital signs from each of the operational suited units, namely of their heart rate. The protection offered by the suits may cause the operational suited units to expose themselves to hazardous temperatures. Through the monitoring of heart rate and air temperature the temperature of the operational suited unit is inferred. This procedure allows the evaluation of the vital condition of each operational suited unit, in view of the rapid replacement and redistribution of the operational suited units in the terrain. Another technical advantage is the possibility to monitor the position of the operation suited unit, specifically the position of the torso, the angle of the upper limbs in regards to the torso, and the bending angle of the arms and legs. The monitoring of these parameters is an additional element in the evaluation of the health state of each operational suited unit.

One other technical advantage is the way in which the present invention was designed in terms of computer hardware/suit integration. The design was conduced in an autonomous way, but looking to enable interoperability, enabling easy maintenance to repair/substitute hardware, as well as to clean the textiles.

Another technical advantage of the present invention includes the materials used in the suit, which were globally defined and produced in view of comfort and characteristics of rescue operations.

One other technical advantage of the present invention is the integration of different information elements, including maps, location of the suited operational units, their position in regard to the ground and their health status, in various interfaces which enable the transmission of information to the operational suited units in the most adequate format, being by sound or by visualization of the information in a screen.

Another technical advantage of the present invention is the integration of an alarm module for monitoring vital signs. Thresholds are defined and whenever these thresholds are reached, and alarm is triggered to signal a situation of danger.

One other technical advantage includes the utilization of different communication channels, allowing the selection of the channel which better suits a determined scenario, and allowing the maintenance of communication under adverse conditions, such as network overload.

Still another technical advantage consists in the use of temporary memories in the support vehicle information subsystem thus allowing for a quicker access to information which is frequently accessed.

Additional technical advantages may be perceived by experts from the drawings, description and claims of the present invention.

DETAILED DESCRIPTION OF THE PREFRENCIAL EMBODIMENT OF THE PRESENT INVENTION

The description that herein follows should be taken as typical, from a preferential embodiment of the present invention, and not limiting the present invention to the techniques, materials, styles and configurations presently known. New techniques, models, materials and designs may be utilizes without falling out of scope of the present invention.

Figure 1:
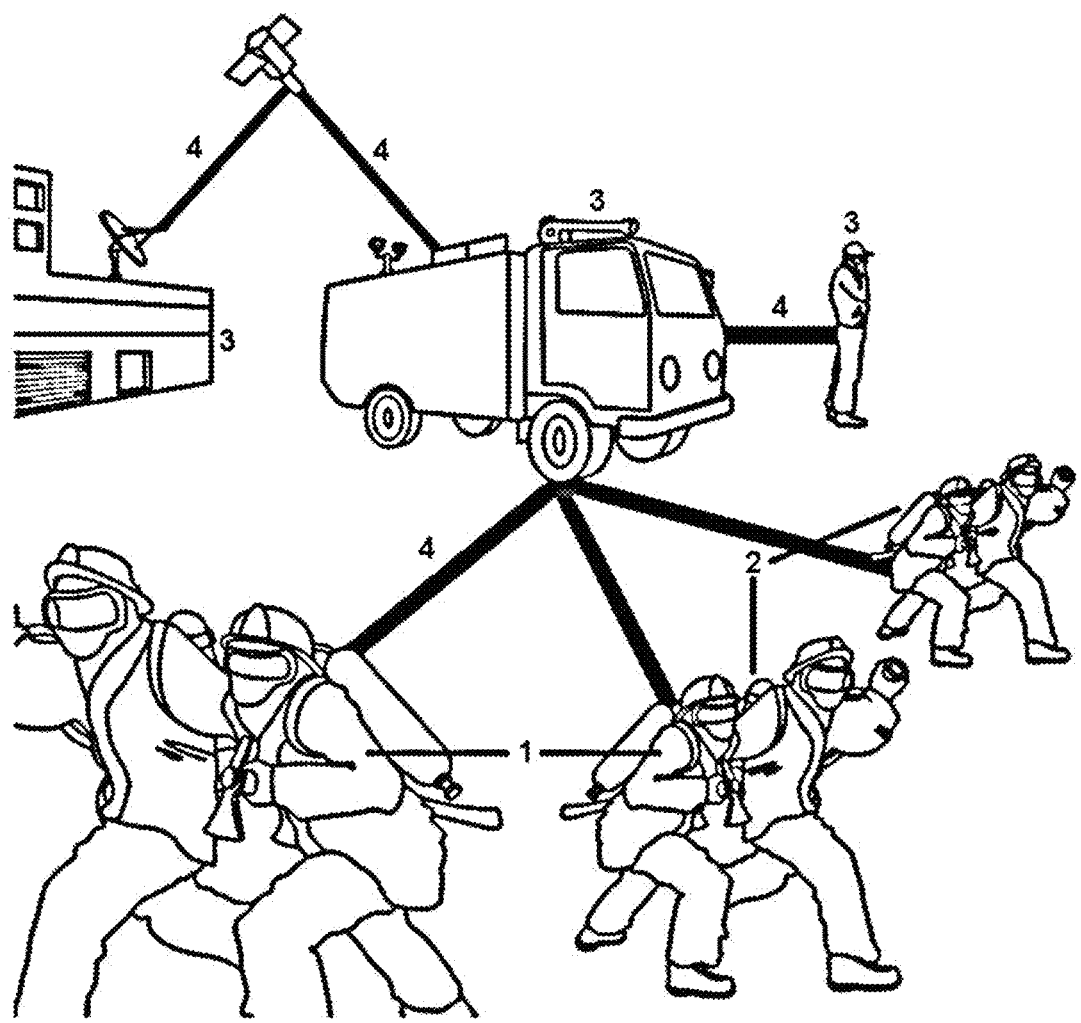
FIG. 1. Schematic view of the different systems of the present invention.

FIG. 1 is a schematic view of the different systems of the present invention. The present invention consist of an integrated system of data monitoring and communicating for managing rescue units which integrates and operational suit (1), an electronic system (2) integrated into the operational suit, a telecommunication system (4) and an information system (3). The operational suit (1) comprises a coat, a vest and pants. The electronic system (2) comprises all the utilized electronic components, which include all the vital sign acquisition, torso and limb position, and orientation sensors of the operational suited unit, as well as the data processing components. The telecommunication system (4) comprises the entire telecommunication infrastructure utilized in the present invention. The information system (3) comprises the software utilized by the wireless devices and by the server including the text messaging module. The systems of the present invention are autonomous, but of their interleaving results the global system.

The suit (1) was designed considering the electronic system to incorporate fireproof, waterproof, heatproof and impact resistant materials, suits currently in use by rescue units and the equipment used in forest fire fighting, e.g. hoses, fire shelters, lanterns and fire extinguishers. The suit protects the inferior and superior parts of the body and is composed of a superior part—which integrates an exterior part designated as coat, and an interior part, designated as vest)—and pants, which together only leave uncovered the head, hand and feet. The superior part integrates a compartment a compartment, integrated in the vest which protects the electronic system, and the pants are easily removable. The superior part and the pants have a lining which allows the passage of the cables which connect the microprocessors to the integrated sensors, distributed in the suit. The format and the fireproof materials of the suit create thermal resistance inside the lining which effectively protects the systems and communication devices, as well as the sensors and cables, and the operational suited unit itself as a whole.

The suit was designed to optimize the mobility of the operational suited unit, considering the nature of the activity and the need to integrate the electronic system inside the suit. The suit is still compatible with additional protection equipment, e.g. boots, gloves, helmets, and other equipment, e.g. portable fire extinguishers, hoses, fire shelters and lanterns. The sews of the suit provide for minimal resistance and protection loss, by being vulcanized sutures which ensure the integrity of the suit. The sews utilize fireproof string. The closing system of the suit consists of a specially designed zipper. The pants comprise no locking system since they are wide and ease to remove by a system of suspenders.

The suit was designed following a performance study for high visibility clothing. Regulations EN 340 (Protective clothing: General requirements) and EN 471 (High-visibility warning clothing) were taken into consideration in order to enable the best visibility in most situations, including low-light situations. For such effect, the suit integrated parts out of reflective material. The regulations which define high visibility of materials are not rigid; however, it was sought that an individual could be found in situations of danger, by incorporating the referred regulations in the general requirements for protective clothing, and by utilizing reflective materials in adequate parts of the suit. The area of application of the reflective materials complies with the minimum defined in the referred regulations, which guarantees the identification of the presence of an operational suited unit in any natural light conditions, and also when illuminated by an artificial light source in the absence of natural light.

Elastics in the superior part sleeves protect the wrists and minimize injury caused by sharp and/or burning objects, and can be used in conjunction with protective gloves, non encumbering the ease of putting the suit on. In the inferior part of the suit, the pants are comfortable and easy to remove through suspenders. The pants still function to protect the abdomen, allowing for the superior part to be smaller, and facilitating a lowered stance position. In the suit, the rigid, wedged accessories do not have contact with liquids, heat, or flames. The suit is easy to maintain and clean, because of the characteristics and disposition of the utilized materials. Furthermore, space for placing tags, distics or decorations does not interfere with the visibility of the suit.

The electronic system (2) is composed of different sensors which monitor the location, orientation and vital signs of and operational suited unit, in real-time. Monitoring the data collected by the sensors can be instrumental in preventing injuries, as well as exposure to dangerous conditions. Knowledge of the location of an operational suited unit may help to determine if it is in a situation of danger. Equally, resorting to inclinometers and limb flexion sensors may help to infer whether the operational suited unit is in a prolonged horizontal position, which indicates a situation of loss of conscience. Temperature is also monitored through the suit, compensating the loss of sensitivity of the operationals caused by the use of the protective suit.

Monitoring the heart rate of the operational suited unit may identify abnormal stress situations, accelerated heartbeats, and also indicating other problems. According to collected data, alarms can be triggered, which alert the operational suited unit in case of danger. Remote alarms can be triggered either by the operational suited unit, or by the coordinator, and also in an automatic way by the server.

All the information collected by the sensors is sent to the subsystem of the support vehicle. The sensors are connected to a hardware panel, the main module, in the back of the operational suited unit, and protected by the suit. The different cables are also integrated in the suit, connecting the different sensors to a microprocessor which digitalizes the analogue readings. Other microprocessors are used to process and analyse data and their correspondent sending through the RS-232 protocol to the communication system.

The telecommunication system (4) integrates several communication technologies, described below, to transmit data between the components of the system. Given the limitations found in radiofrequency communications, different technologies were selected to communicate between the different components, optimized to different scenarios. For communications between the suit and the support vehicle a Very High Frequency—Ultra High Frequency network is utilized, which has low bandwidth, but long range to connect the operational suited unit to the support vehicle, without employing additional infrastructure. In the communication between the support vehicle subsystem and the wireless device subsystem a Wi-Fi network is utilized, which has enough bandwidth to allow for map fetching and visualization in real-time. The communication between the support vehicle and the server subsystem is made by long range terrestrial communications, or satellite communications. Long range terrestrial communications allow for greater bandwidth than satellite communications. However, their availability is not certain in all scenarios, and the system automatically switches to a communication mode based in local availability.

The information system (3) integrates software for the electronic subsystem, support vehicle subsystem and server subsystem, integrating the map service, content manager and further applications. For exchanging messages between the different subsystems the information system further comprises a messaging subsystem. The messaging subsystem integrates small binary information units with different types of fields, whether Boolean, integers, real numbers, text or structures containing the aforementioned units, allowing in its simplicity that messages are transmitted in an efficient manner even when the connection is providing for low bandwidth. The support vehicle subsystem works as a message router, receiving messages and forwarding them to the respective addresses.

The present invention combines the different aforementioned telecommunication subsystems, utilizing different telecommunication technologies. The communication between the operational and the support vehicle is made through Ultra High Frequency—Very High Frequency technology to provide for the best coverage between the operational suited unit and the support vehicle. The support vehicle communicates with the wireless device through Wi-Fi technology. Wi-Fi technology allow for the use of greater bandwidth for superior data transfer rates, which is important given the quantity of data associated to the preferential embodiment of the present invention, which includes the transmission of maps. Between the support vehicle and the server a precise, reliable and effective communication is required to ensure maximum operacionality, even in situations in which terrestrial communications are not available. In emergency situations, terrestrial communications may be unavailable because of overflooding, or because of the destruction of infrastructures necessary to the functioning of the system. Satellite communications are unaffected problems, serving as an alternative to terrestrial communications.

To ensure that you can establish a connection between the support vehicle and the central server, the telecommunication system of the present invention selects, according to availability of the communication technologies, between satellite communications and terrestrial communications, in the preferential embodiment GPRS/GSM. The communication system is required to allow for coverage in a 300 m radius, each support vehicle being able to support 10 operational suited units, and 5 support vehicles are able to share the same area of intervention at a minimum data latency of 2 minutes, which implies a minimum transfer rate of 200 bps in relation to 300 bytes blocks. Even with satellite communications a data transfer rate of 9600 bps can be achieved.

The subsystem of the wireless device can be materialized in a wireless device with Wi-Fi networking, such as but not limited to a PDA, a mobile phone or a tablet PC. The server subsystem must be in a protected location with Internet access. This subsystem can be physically located in a single computer, and the use of several redundant Personal Computers can be a low cost solution. The support vehicle subsystem can also consist in a Personal Computer, with the alteration of a USB memory or solid state disk being utilized instead of a conventional hard drive, which would be damaged by the motion of the vehicle. The joining of data and operating system in a memory easy to transport simplifies the maintenance of the system, by the ease of its replacement, the overwrite protection and password-restricted access.

The distinction between the support vehicle—which will typically be a fire fighting vehicle but may be another type of vehicle—and the server is not fixed. Depending on the specific embodiment, a vehicle may operate fully without support from the central server, or a support vehicle may not be required, as long as the distance to the server is encompassed by existing communications.

The format of each message consists of, in its preferential embodiment, of 4 bytes with information on the size of the message in bytes; enabling the messages may to be up to 2 GB of data; 2 bytes with a message identifier, allowing to define the format of the message, in a way that it will be read correctly by the receiving unit, comprising up to 65536 different message types; 6 bytes with a routing identifier, specified by the transmitting device, and which is not modified by the subsystem of the support vehicle; the remaining bytes are reserved for the message with the value specified in the first 2 bytes. The value of the identifier is inserted by the server subsystem in the response so that the support vehicle subsystem delivers the message to the respective device.

The cables integrated in the suit transmit the data collected by each of the sensors. The length of the cables is referred for the preferential embodiment, and is subject to adjustment. In a preferential embodiment of the present invention, the cable to link the GPS antenna incorporated atop the panel measures around 25 cm (c10/AN). The electronic system also comprises an alarm module connected through a 42 cm cable (C9/AL) to the back of the torso of the operational suited unit.

To allow the measurement of the flexing angle of the elbow, the electronic system integrates a cable with about 53 cm (C2/S1) on the left side and about 55 cm on the right side (C3/S1). The electronic system further incorporates a cable which links the protection panel of the main module to the sensors placed in the sleeves of the suit and which allow for the measurement of the operational suited unit's heart rate, on the left side the cable measuring about 96 cm (C4/EL) and on the right side about 87 cm (CS/EL). The electronic system further incorporates a cable which links the sensor cables incorporated in the pants to the circuit in the superior part of the suit. The cable which links the main module of the electronic system to the lock measures about 58 cm (C6/S2), including a section in spiral which allows for liberty of movement. Finally, the electronic system includes cables which link the connection lock situated on the knees to the sensors which measure the angle of flexion of the knees, which measures about 57 cm (C7/S2) on the left side and about 97 cm (C8/S2) on the right side. The utilization of different cable lengths relates to different connections to the sensors from the panel or the connection locks of the cables between the pants and the superior part of the suit.

Figure 2:
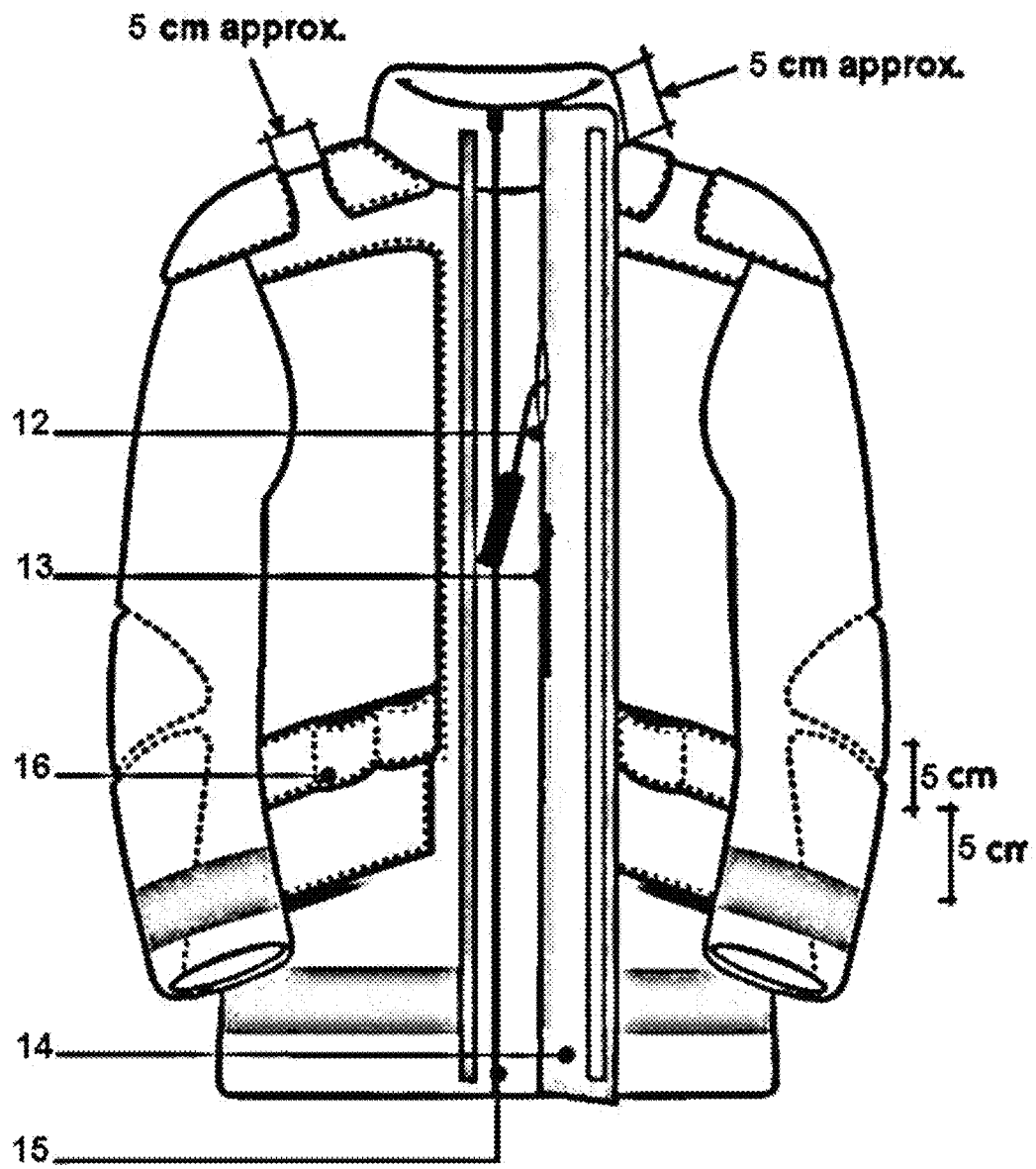
FIG. 2. Frontal view of the coat with the front side (14) open.

FIG. 2 is a frontal view of the coat with the front part (14) open. The front part (14) functions to protect the interior of the suit. In this preferred embodiment of the present invention, the front part (14) allows access to an interior pocket (13), and alarm cord (12) and a zipper (15). Inside the front part (14), in the superior part, there is an opening for accessing the alarm module (12). Further below, there is an opening for the interior pocket (13), further allowing access to a mobile phone. The coat also comprises a two-piece zipper, the upper piece to open the coat and the lower piece to access the connection of the superior part of the suit with the pants. The coat further comprises a false belt system (16) with the capacity to support objects such as but not limited to a fire shelter and a lantern.

Figure 3:
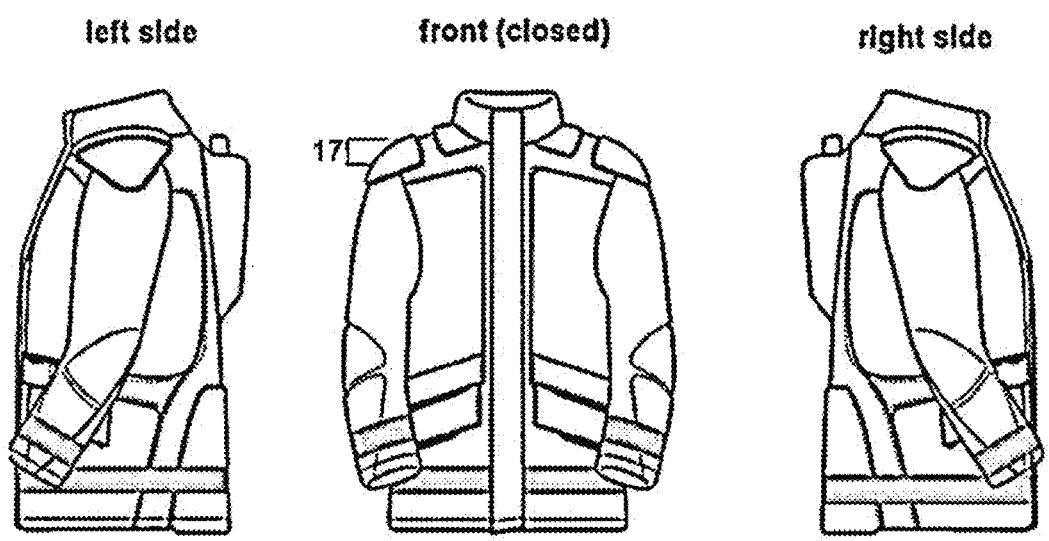
FIG. 3. Set of views of the coat, namely left side view, front view closed view and right side view.

FIG. 3 is a set of views of the coat, namely a left side view, a frontal view with the front part closed and a right side view. This figure illustrates the protection (17) which helps to support, e.g. the handles of a portable fire extinguisher or of a case for a hose. The hardware panel is also visible.

Figure 4:
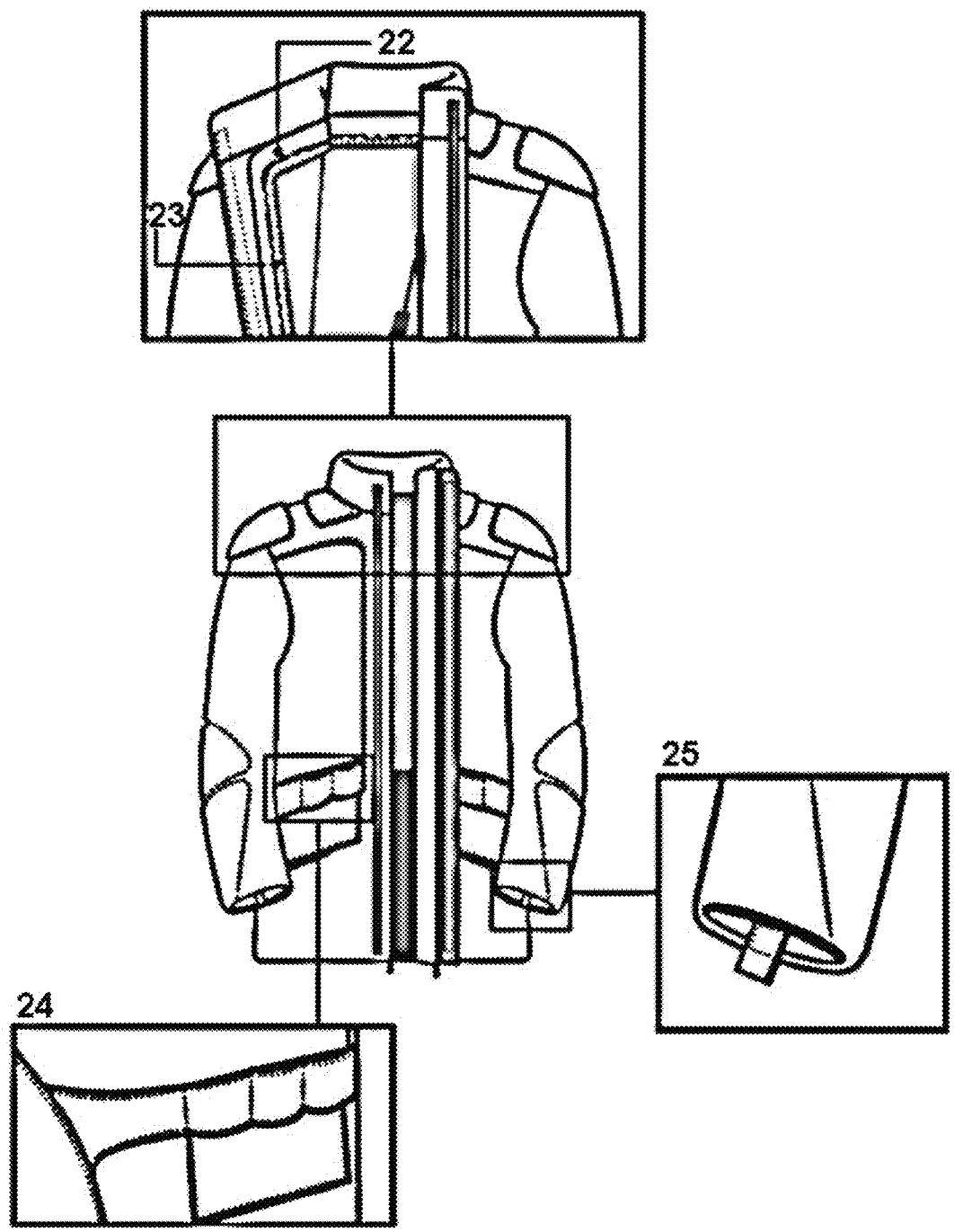
FIG. 4. Detailed frontal view of the coat.

FIG. 4 is a frontal view of the details of the coat. On top there is visible the fold (22) that protects the inner lock (23), as well as the link to the lining of the coat.

The figure further shows the subsystem that supports the diverse objects utilized by members of rescue teams, such as but not limited to a fire shelter or a lantern, placed by the waist (24). The figure also shows the details of the cuff of the coat, where a safety pad is visible for that the inside of the sleeve is not misplaced upon equipping the coat (25).

Figure 5:
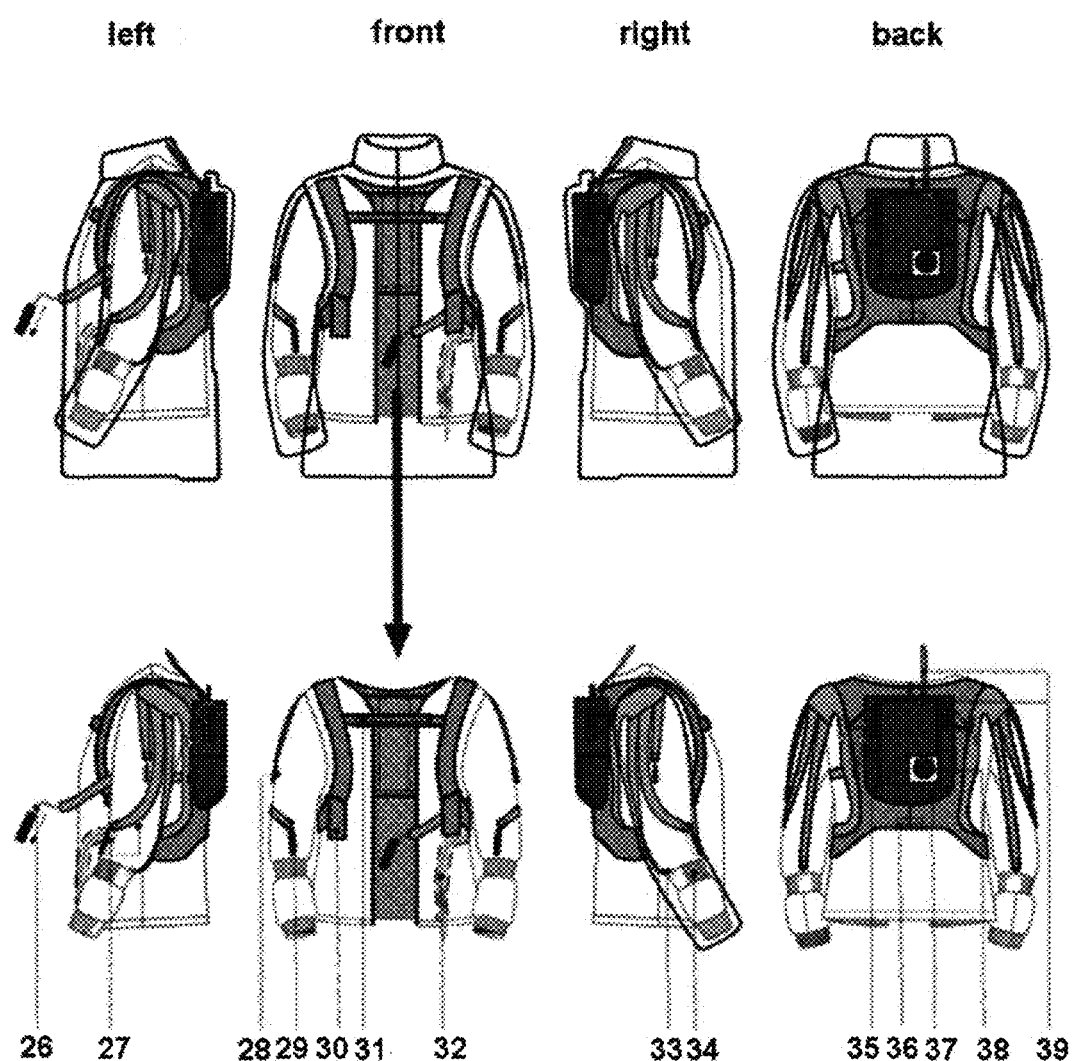
FIG. 5. Set of views of the vest and the lining.

FIG. 5 is a set of different views of the vest and the lining. The figure presents a left side view, a frontal view, a right side view and a back view, from left to right. In the left side view there can be seen the cord for the alarm module (26) utilized by the operational suited unit to signal a situation of danger, and fast strap bands (27) for supporting the panel. In the front view there is marked the position of the inclinometers (28) which allows for the determination of the position of the upper limbs regarding the torso, the location of the flexion sensors (29) for the upper limbs, the side lock (left and right) of the panel (30), the frontal support of the panel where fast strap bands (31) are utilized, and a tubular system for the connection of the coat and the pants (32). The right side view shows the location of the sensors for measuring the heart rate (33) and also the integration of said sensors (43) in an exterior view. In the back view of the suit there can be seen the connections of the different cables to the panel microprocessor (35), a fast strap band on the back of the suit for adjusting placement (36), the structure in layers for supporting and protecting the panel of the main module (37), the sound port for the alarm module (38) and the antenna cable for the Global Positioning module (39). In the preferred embodiment, the global location module to be used is the Global Positioning System.

Figure 6:
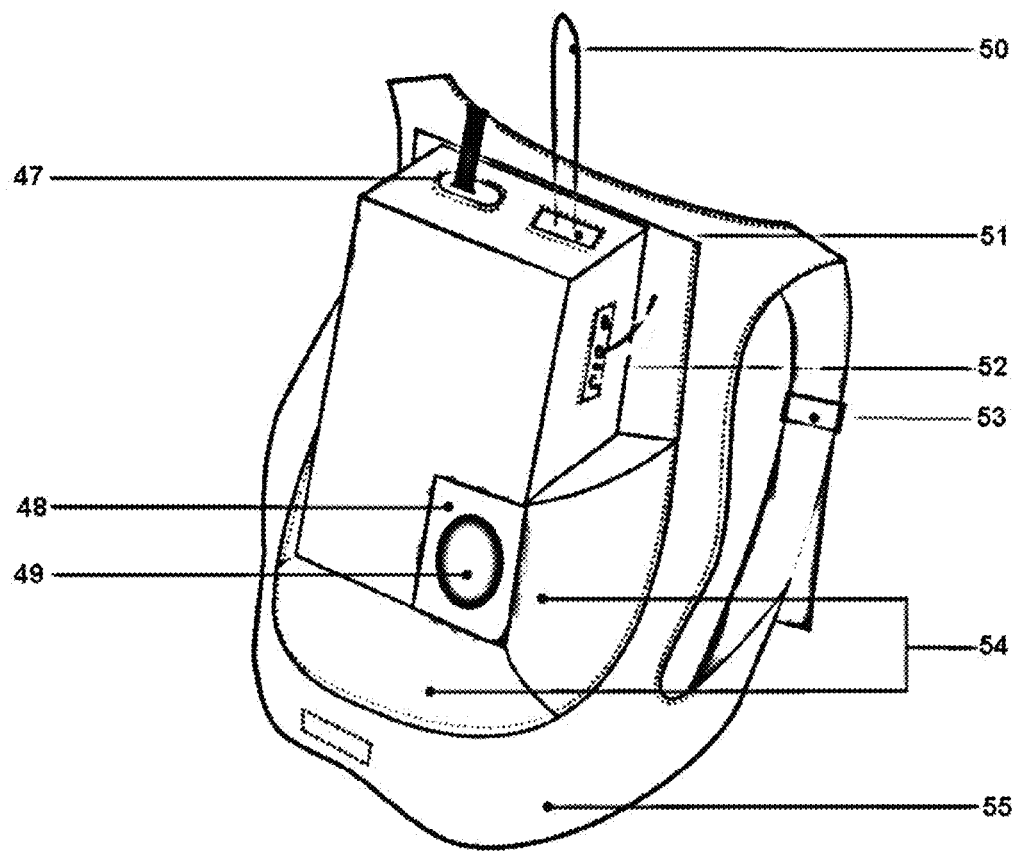
FIG. 6. Perspective view of the protection module for the hardware panel, and supporting vest.

FIG. 6 is a perspective view of the panel protection module and supporting vest. To the top left, an Ultra High Frequency antenna (47) can be seen, which is utilized in the communications between the operational suited unit and the support vehicle. To the bottom right, the support for the soundport (48) can be seen. The figure further illustrates the loudspeaker (49) utilized by the alarm module. The figure illustrates still the C10/An cable (50) for connecting the Global Positioning System antenna (51). Still illustrated in the figure are the connections (52) for the different cables to the panel for the main module of the electronic system. Also to be seen is the adjustment system (53) for the vest. The panel of the main module is still wrapped in a multi-layer protection (54). Finally, the figure illustrates the support vest for the main module (55).

Figure 7:
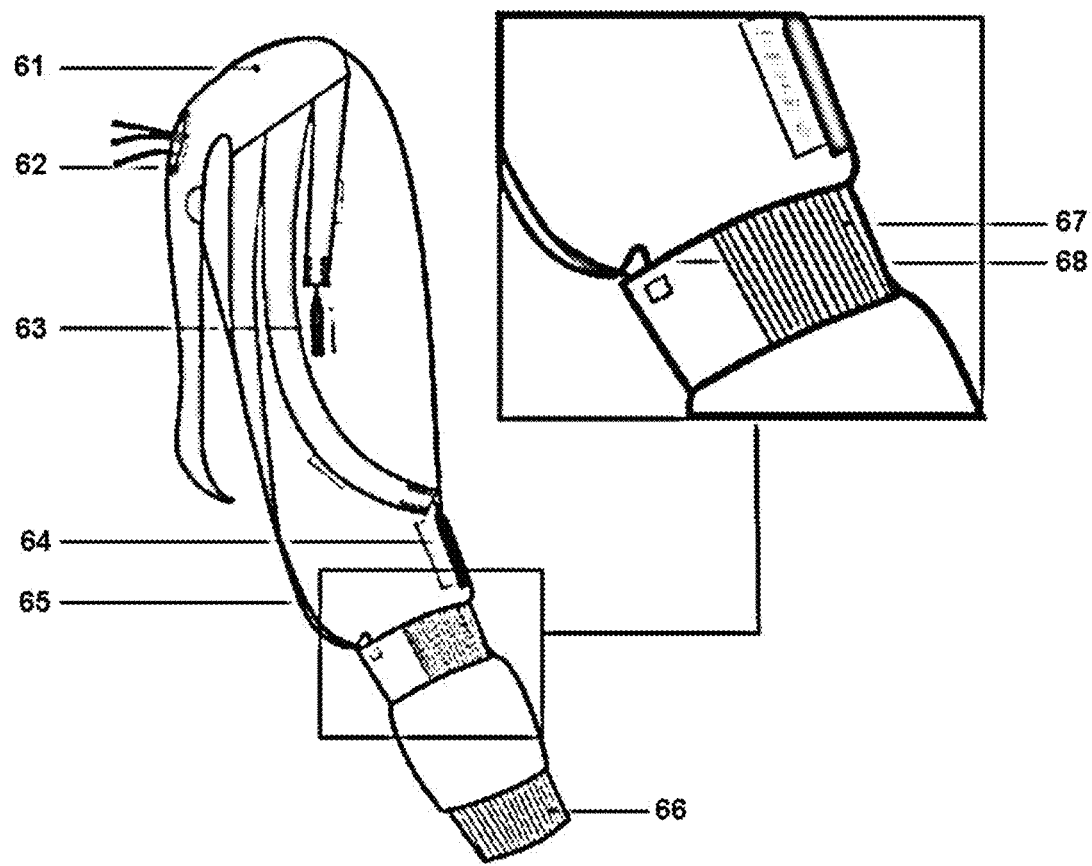
FIG. 7. Side view of the tubular module for integrating the sensors in the sleeves of the coat.

FIG. 7 is a side view of the tubular subsystem for integrating the sensors in the sleeves of the suit. The tubular system (61) protects and guides the cables of the system. By the shoulder there is the exit of the tubular system (62). Further below, in each arm there is an inclinometer (63) which measures the position of the arm regarding the torso. Another sensor (64) determines the flexion angle of the arm. The figure further illustrates the tube (65) for integrating the cables from the heart rate sensors, C4/EL in the left sleeve and C5/EL in the right sleeve. Below, a figure further illustrates the wrist protection (66). In greater detail, on the top right corner of the figure, there is illustrated the protection of the heart rate sensors (67). This embodiment optimizes contact between skin and sensor. In the detailed view there is still illustrated the entrance point (68) for the sensors.

Figure 8:
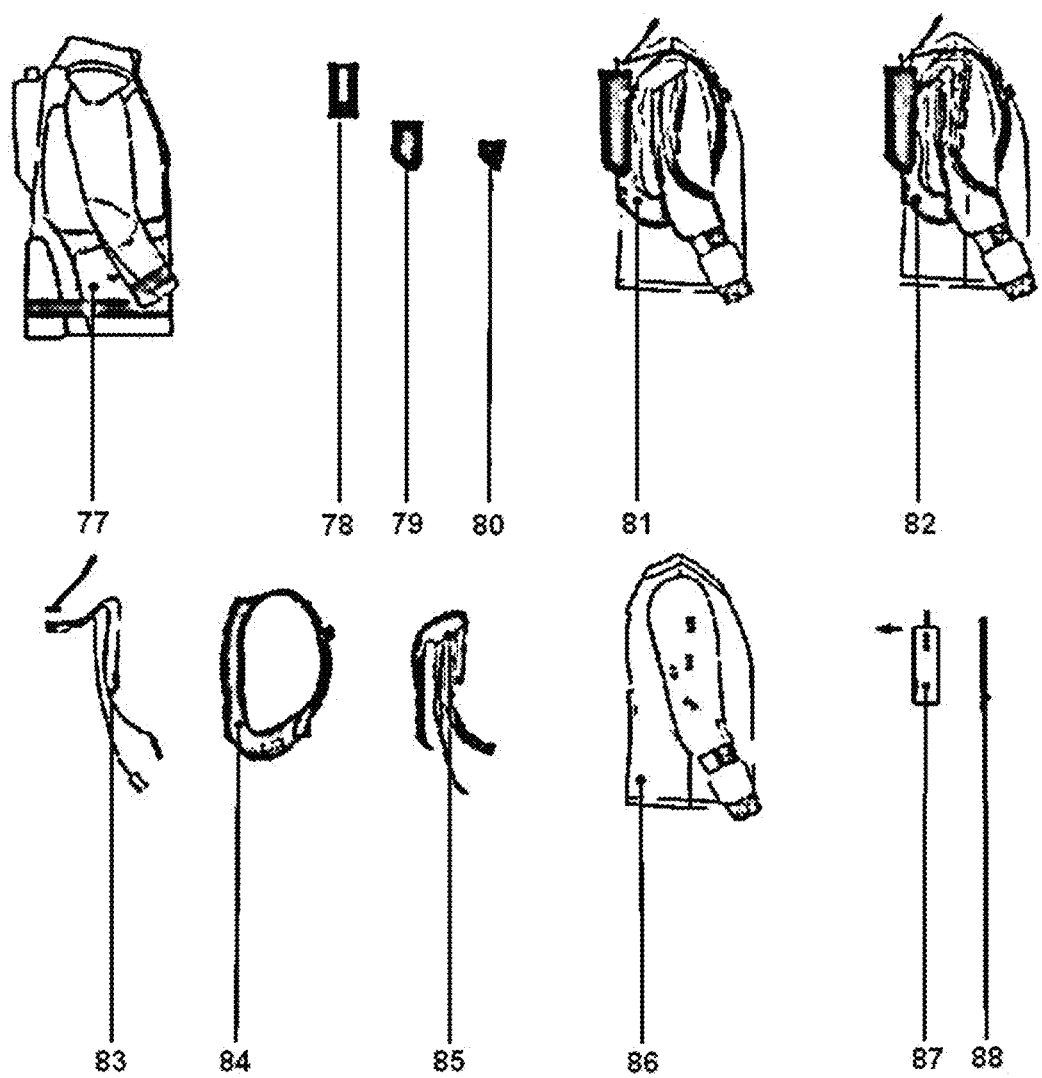
FIG. 8. Right side view of an image sequence with the different components of the hardware system integrated in the vest.

FIG. 8 is a side view of a sequence of images with the different components of the superior part of the suit. From top left corner to bottom right corner, there if first the coat (77). Then there are illustrated the components for integrating the panel of the main module of the electronic system (78) (79); the point (80) illustrates the inner layers of protection of the main module. The following image (81) is a general view of the main module. Image (82) illustrates the main module with the tubular cable guiding system. There is also the isolated tubular cable guiding system (83). Image (84) is of the vest for integration into the main module, where also is seen the straps for supporting and adjusting the vest. Image (85) illustrates the tubular system to apply in the sleeves of the vest to guide and protect the different cables. Image (86) shows the lining and location of the fast strap band to adjust the vest that supports the electronic system. Image (87) illustrates the panel of the main module and finally image (88) is of the access panel for the main module.

Figure 9:
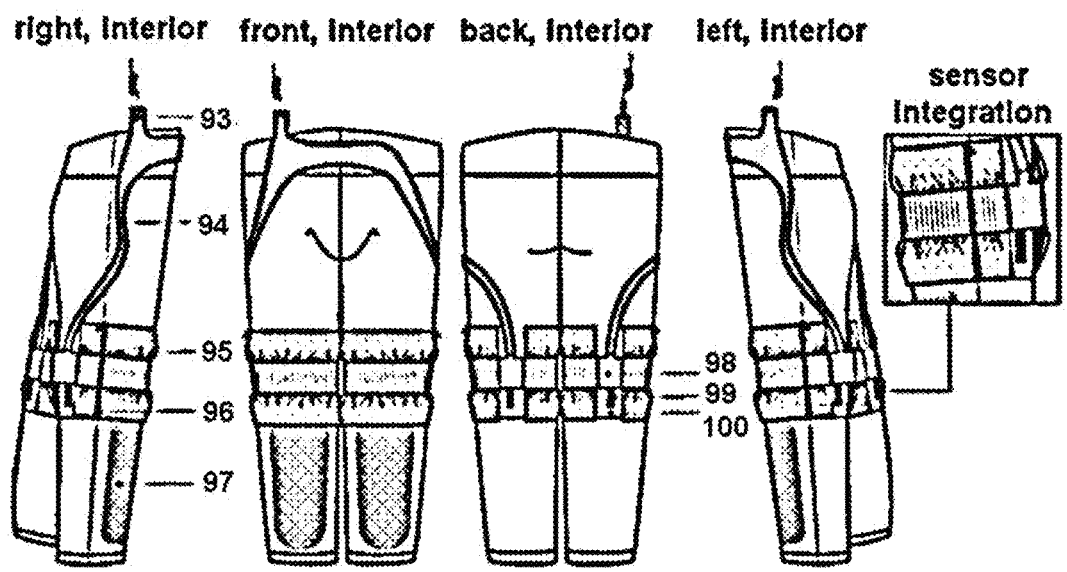
FIG. 9. Set of views of the interior of the pants.

FIG. 9 is a set of views of the inside of the pants. From left to right, the first image is a right side view of the interior of the pants where you can see the exit of the connecting cable (93), the tubular cabling subsystem (94), the knee features for increased comfort (95), the lock for the knee flexion sensors (96) and a frontal protection (97). The next image is a frontal view of the pants, where there can be seen a pocket for protecting the sensor which measures the flexion angle of the knee (98), said sensor (99), and the protection part for placing said sensor behind the knees (100). The last image in FIG. 9 reveals in greater detail the integration of the sensors.

Figure 10:
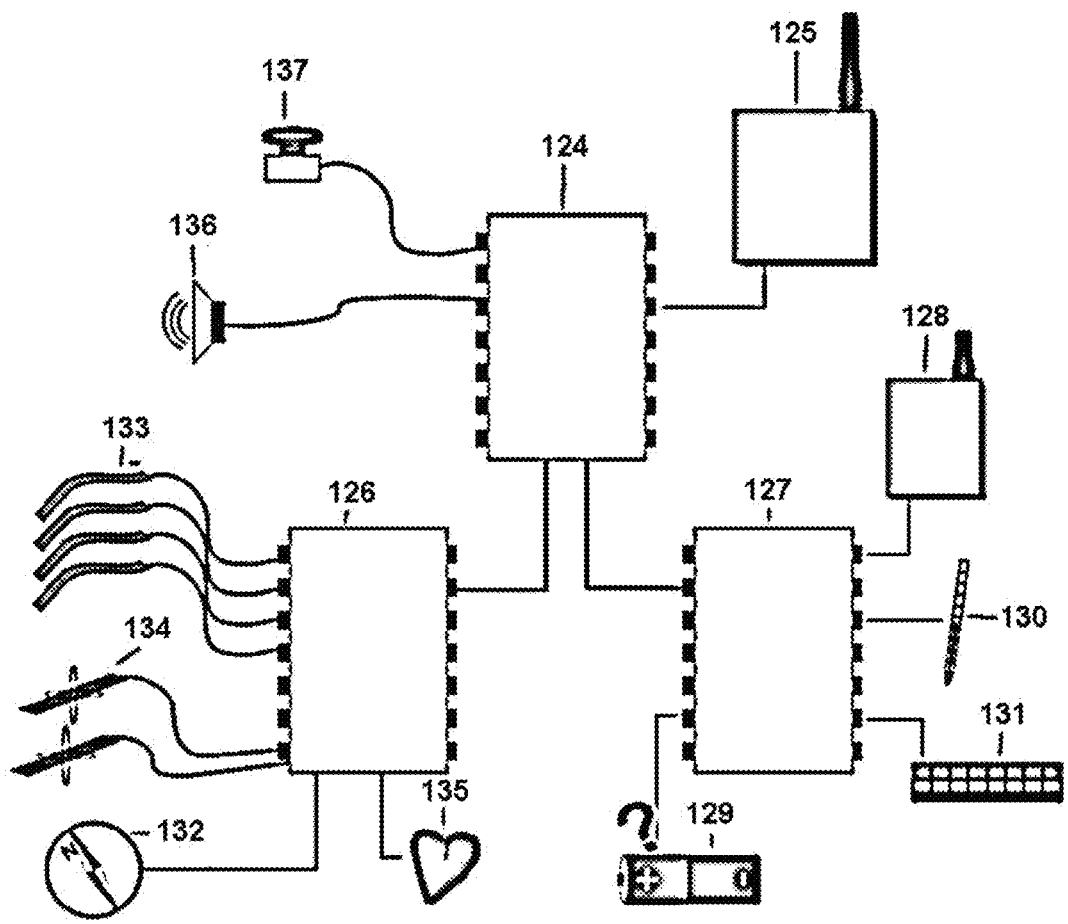
FIG. 10. Schematic view of the main system module of the electronic system with the main microprocessor and the sensor microprocessor, as well the connections for the sensors.

FIG. 10 is a schematic view of the sensor and microprocessor architecture utilized in the main module of the electronic system. The architecture is based in three microprocessors, each dedicated to different tasks of monitoring or communication. The main microprocessor (124) has as function to communicate with the support vehicle subsystem through a modem (125) and also to communicate with the remaining processors (126) (127). The main microprocessor (124) functions to synchronize all message traffic in the electronic system. Furthermore, the main microprocessor (124) is still in charge of monitoring the alarm module, which is a prioritary event. The alarm cord (137) may be pulled by the operational suited unit in case of emergency, generating an alarm which is then transmitted to the support vehicle subsystem, and to subsystems of the server and the wireless device. It further integrates a sound system (136), which allows for messages to be transmitted to the operational suited user in the form of sound patterns. This type of communication is efficient and intuitive after habituation/training, and always just minimally disturbing of the attention of the operational suited unit. The alarm sound notifies the operational suited unit about situations of danger, as well as notifying it about hardware malfunction, and still about messages sent by the subsystems of the server or the wireless device.

There is also a sensor microprocessor (126) which function is to monitor the sensors at the highest possible refresh rate. When the main microprocessor executes a request, this microprocessor responds with the last data from all the sensors. The torso inclinometer measures the verticality of the operational suited unit in regards to the ground. When the position of the torso in one of the axels is about 90° it indicates a horizontal position of the operational suited unit. The sensor microprocessor still includes 2 inclinometers (134), one for each arm, to determine the position of the upper limbs regarding the torso. The inclinometers (134) function over 2 axels and work as variable resistances. Knowledge of the axels on which the inclinometers work allows the knowledge of the shoulder inclination and its degree of rotation over the shoulder. In the preferred embodiment of the present invention, only the value of inclination is used. There are also integrated sensors to measure the flexion of the limbs (133) of the operational suited unit. The sensors are made of thin film layers which work as variable resistances. Since the film is fragile, it is covered by adaptative rubber, which protects the film and allow for its safe torsion. The sensor microprocessor further integrates sensors for measuring heart rate and calculate the average of heartbeats per minute. Calibration of the sensors is executed after the operational presses a calibration button.

The microprocessor of the global location module (127), preferentially embodied by the Global Positioning System, includes an algorithm for analysis of the NMEA data from the Global Positioning System (128), collecting latitude, longitude, speed o movement, magnetic variation and the number of active satellites. This microprocessor is not solely dedicated to the Global Positioning System, also monitoring the level of the battery (129), air temperature through a digital thermometer (130) and the ID selector (131), since each suit has a unique ID. Monitoring the Global Positioning System (128) takes time in the process, since the NMEA data is provided in ASCII format, thus necessitating processing to be examined. This processing makes the microprocessor of the global location module slower than the sensor microprocessor (126). Consequently, the sensors associated to this microprocessor monitor only low-dynamic data, for instance temperature (130) and battery (129), and the static ID (131). By the Global Positioning System (128), the location of the operational suited unit is obtained, which is then transmitted to the microprocessor of the global location module (127) through the protocol RS-232. The digital compass (132) reports the orientation of the operational suited unit with a 0.1° accuracy also through the RS-232 protocol. Orientation is obtained when the plane of the digital compass (132) is parallel to the ground; additionally, the digital compass (132) can function with an inclination of approximately 60°, this value depending on specific embodiment. The digital compass (132) possesses and inclinometer which enables it to compensate when it is not in a plan parallel to the ground. The inclinometer, measuring the orientation of the torso of the operational suited unit in regard to the ground, allows for the detection of a potential situation of loss of conscience, when, in any angle, the angle of the torso with the plane is approximately 90°.

Figure 11:
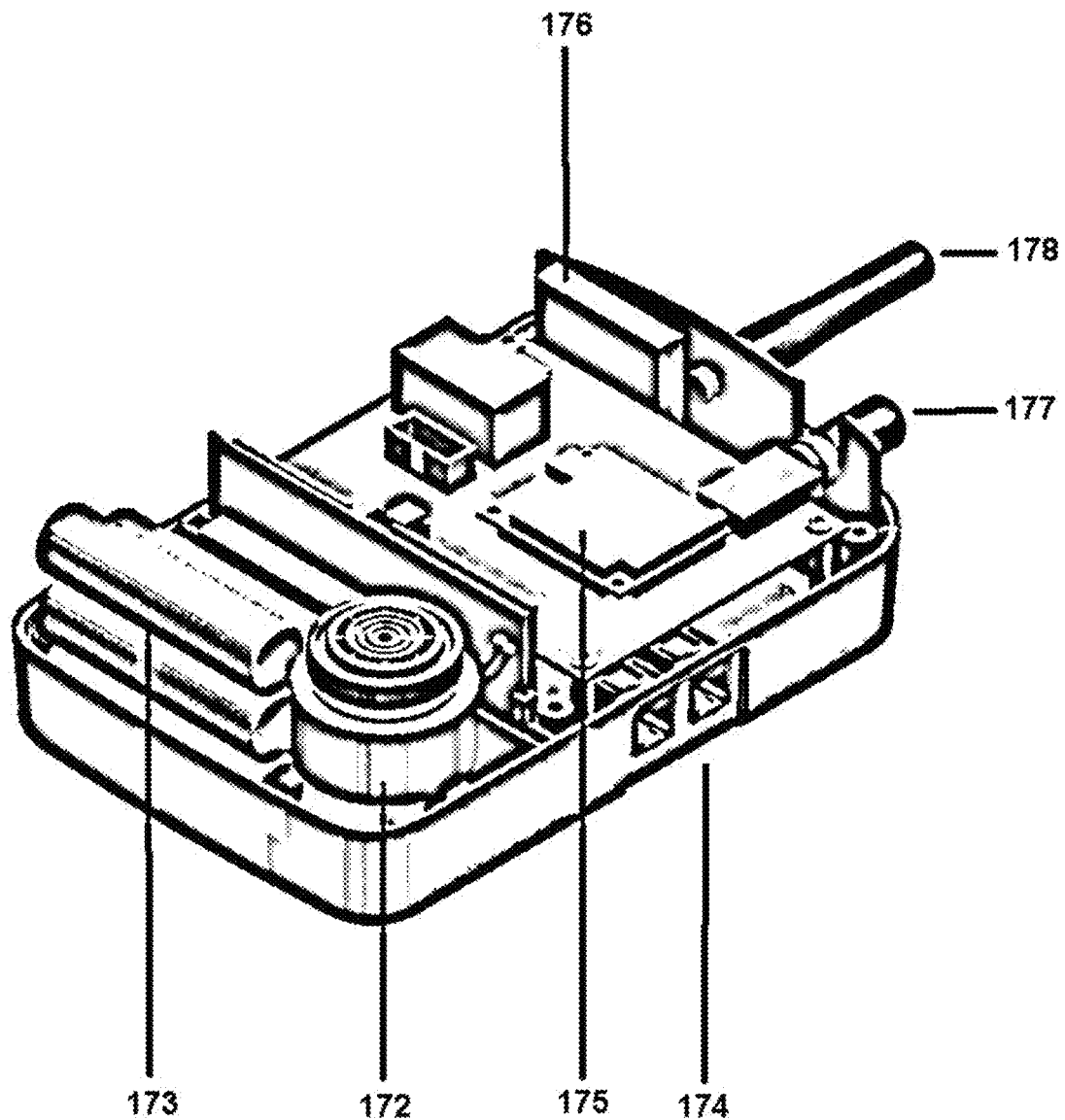
FIG. 11. Perspective view of the integration of all the printed circuits in the hardware panel, together with the sound module, the battery, RJ11 plugs for connecting the sensors, Global Positioning Module, Radiofrequency modem and the antennas for the Global Positioning Module and the modem.

FIG. 11 is a perspective view of the integration of all the printed circuits in the panel of the main module of the electronic system together with the sound module (127), the battery (173), RJ11 plugs for connecting with the sensors (174), GPRS (175), radiofrequency modem (176) and the antennas for the GPS (117) and modem (178).

Figure 12:
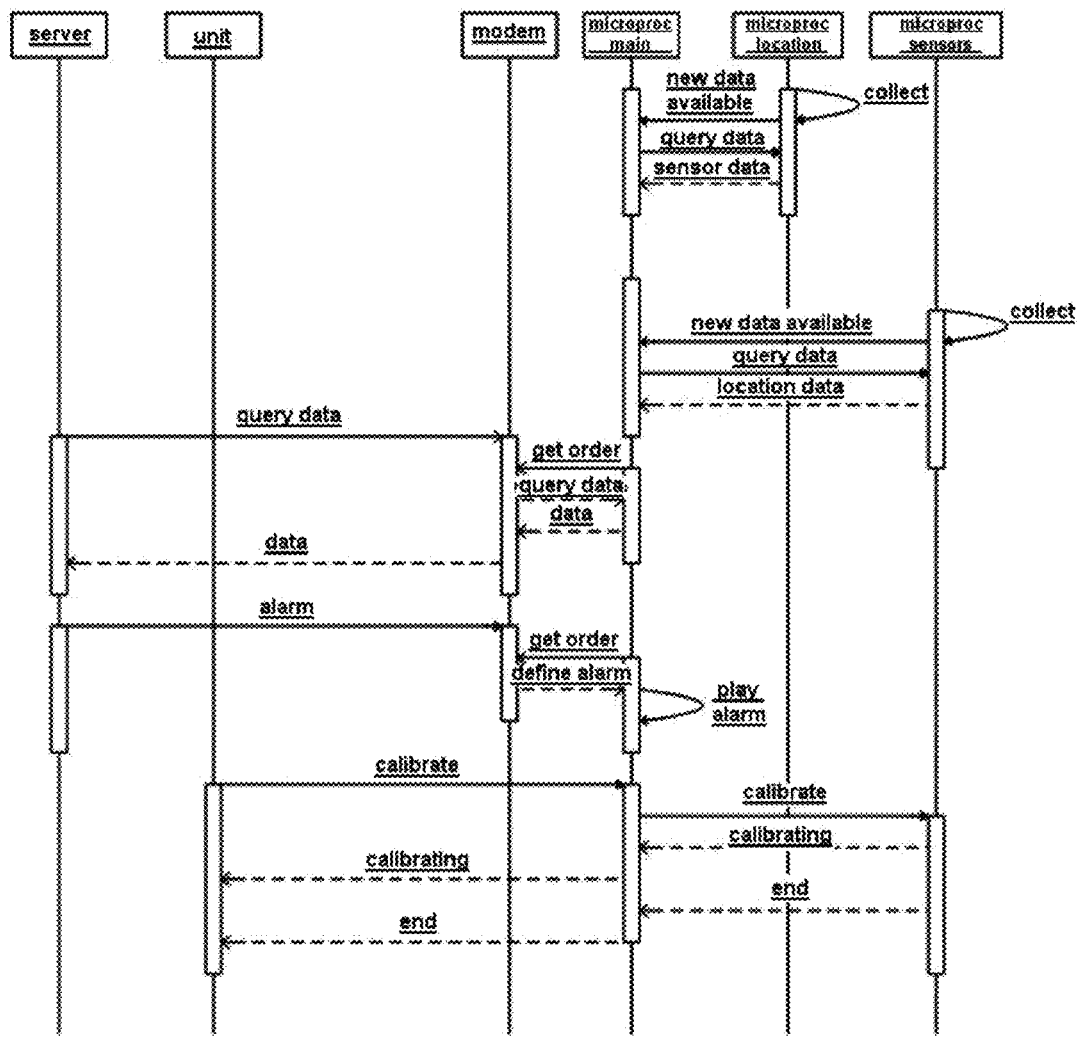
FIG. 12. Schematic view of a sequence diagram with the exchange of messages between the modules of the electronic system which integrate the information system, as well as the modules which communicate with the same.

FIG. 12 is a schematic view of a sequence diagram with the exchange of messages made between the diverse modules of the electronic system which integrate the information system, as well as the subsystems which communicate with it. Since the microprocessors function asynchronously, the scheme in FIG. 12 represents an arbitrary exchange of data, which can be different from that represented. Whenever a message cannot be delivered, the microprocessor continues its processing and attempts to deliver the message at a later time—the microprocessor does not block waiting for a message. As indicated in the figure, the first message to be transmitted is between the microprocessor of the global location module and the main microprocessor. The processor of the global location module warns the main microprocessor that it has new data to transmit, and the latter accepts the data. The exchange of messages between the main microprocessor and the sensor microprocessor occurs in an analogue way. The next message in the sequence is the querying for data from the support vehicle subsystem. For such effect, the support vehicle subsystem sends a "query data" query to the network modem. When the main microprocessor queries the modem about messages of the support vehicle subsystem, the modem delivers the "query data" query, to which the main microprocessor answers with the actual value for each of the sensors. In the cases that the support vehicle subsystem, continuously, transmits the "query data" query, it receives as reply, the data only for the first query. For the remaining queries, the main microprocessor waits for new data, thus ensuring that the data is the most up to date and transmitted in the least time possible. The subsystem for the support vehicle is also capable of sending the message to trigger the alarm. This can be a simple general warning message, which will have an intermittent pattern, or for specific situations a differentiated continuous sound. A last message, for calibration is activated by the operational suited unit. When the operational suited unit activates the calibration button, the main microprocessor transmits the message to the sensor microprocessor, initiating the calibration process. The process of calibration is initiated with a continuous sound for the calibration of the flexion sensors, followed by an intermittent sound for the calibration of the inclinometers. In the first step, the operational suited unit should remain static and, in the following step, when the sound signal becomes continuous, the operational suited unit should move its arms in all directions. The sound stops when the calibration process is complete.

Figure 13:
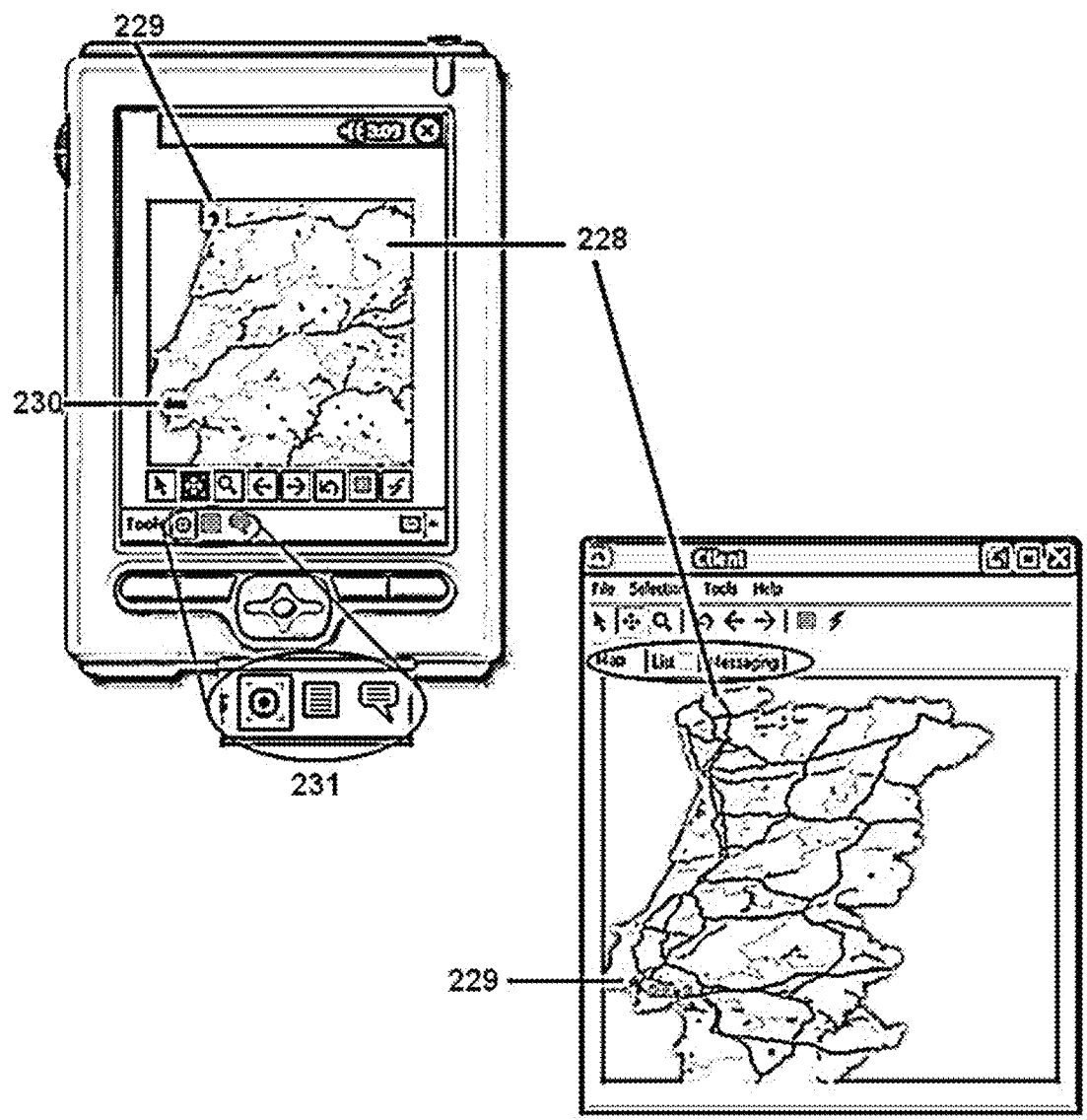
FIG. 13. Frontal view of the maps visualization mode.

FIG. 13 is a frontal view of the visualization mode of the maps in the wireless device subsystem. When the coordinating unit is in map view mode, it visualizes a map of the terrain (228) where there overlap the locations of the operational suited units (229) and of the support vehicles (230). In this mode it is possible to navigate in the map, as well as to select the on screen (231) the scale of visualization. In this mode, the system keeps a history of the viewed maps so navigation through recent maps is possible. The type of map can also be selected.

Figure 14:
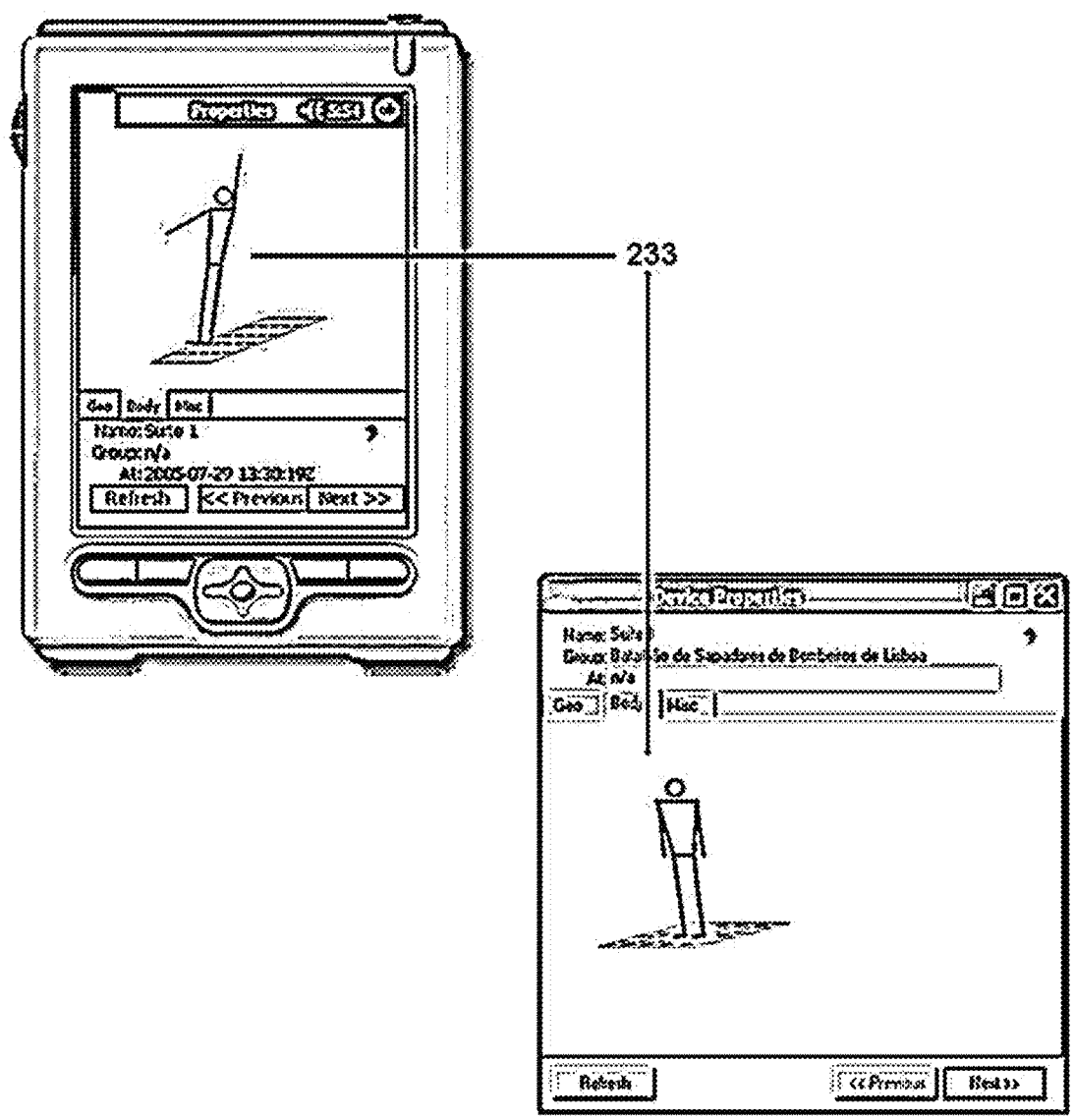
FIG. 14. Frontal view of an implementation for visualising verticality and position relative to the limbs of the operational suited unit.

FIG. 14 is a frontal view of an embodiment of data visualization regarding an operational suited unit (233), in the wireless device subsystem. Regarding each operational suited unit diverse information can be obtained, e.g. location, torso and limb position, battery status, temperature. Whenever an alarm is triggered, the wireless device application shows the alarm superimposed to the information which is being visualized.

In the support vehicle, the temporary memory module utilized for the maps is used to cache a limited amount of previously visualized maps, allowing for speed in going back to maps; it is however not excluded that the complete map database is implemented in the vehicle itself, this being just the preferred embodiment. The temporary memory module utilizes fragments from maps for different locations and with different scales, which leads to the need of producing said heterogeneous maps. Whenever a map is requested, the cache fragments are checked for intersection with the requested map, if they are of the same type as the requested and if they have an equal or greater resolution than requested. The fragments that fulfil all these conditions are resized and framed in the new map, which is immediately sent to the client applications. The missing fragments are then requested of the server. The module further allows defining which types of map can be kept in the temporary memory. When the support vehicle subsystem receives all the fragments of the map, it is composed and sent to the client application.

Whenever the speed of the support vehicle is below a definable threshold, the temporary memory module automatically triggers the download of the maps for the current location. Location is obtained though the Global Positioning System receiver installed in the support vehicle. The support vehicle subsystem also functions to receive the values from the sensors, by sending data queries from the sensors to all the channels by radiofrequency modems. The support vehicle subsystem further includes a Global Positioning System device, and other sensors can optionally be triggered as referred above. The information from all the sensors of the support vehicle module is also sent to the server. The support vehicle subsystem is also involved in the alarm module. The alarms can be generated in the server subsystem when a predefined threshold is reached after the analysis of the data from the sensors in the electronic system, or when the operational suited unit pulls the alarm cord; and still on the wireless device when the coordinating unit triggers an alarm form the monitored data.

Another function of the support vehicle subsystem is to manage the logins of the client applications, even when a connection with the server is not in force; the same going for the identification of the electronic systems. Finally, the support vehicle subsystem functions to load the necessary settings for the application to initialize.

The server aggregates all the information so that it can be accessed from any location with Internet access. The embodiment of the server takes into consideration different requirements, such as the simplicity of the system or redundancy of data and processing, to ensure data protection. In the simplest embodiment of the system all components can be integrated into a sole computer, preferably a Personal Computer. In a still simple embodiment with data and processing redundancy, several Personal Computers can be used.

Regardless of these requirements and given the insecure nature of Internet communications, in a preferential embodiment the server is protected by a firewall, to protect the integrity of data and the system. The basic components of the system are the message manager, the data base and redundancy systems which ideally would be in dedicated computers, allowing the distribution of processing by each component of the server. The embodiment of the server may still pass by distributing the subsystem according to geographic areas, paving the way for reinforced redundancy in resorting to solidary cluster for data and processing.

The server is responsible for storing sent messages, decoding, analysing and transmitting data upon request; receiving and compiling all data sent by the electronic systems of the operational suited units and the support vehicles; detecting danger situations and trigger automatic alarms to the client applications; make available data and maps for the support vehicle subsystem an client applications; and rout text messages.

The data is treated using a system composed of three logic layers: transaction layer, data layer and data management layer. The data converters for the text messages only access the transaction layer. At this level, the converters do not have to be solidary with the data storage structure. They can be in an XML file or in a relational database.

At the level of the data layer, data fields, tables and relations are known, but the mode and location of data storage is not present. At the level of the data management layer, the location and arraying of data is present, therein residing a different converter for each type of storage. For instance, XML files, a Microsoft SQL Server database, an Oracle database or a MySQL database. This system allows the server to be adapted to the specifications of each client, without major alterations. For such effect, a data converter is needed, and a small alteration in the configuration file of the server.

All data transmitted to the server is stored in the database, namely session control data, text messages, and history and values regarding devices or sensor data.

By all of the above it is held that the advantages provided by the present invention rely on the integration of components which perform the biometric and location monitoring in emergency or catastrophic situations, associated to alarm modules and multichannel real-time communications. The biometric data allows for the monitoring of the vital signs of the operational suited units, this monitoring being strengthened by the inclusion of alarm modules, indicative of abnormal situations. The integrated system further allows to know the location of the operational suited units in real-time. Another advantage of the present invention is the possibility of utilizing both terrestrial and satellite communications, thus preventing flaws in the transmission of information. Each system that integrates the present invention, in its entirety as integrated system, has value as an important instrument in the management of situations of emergency and catastrophe.

Additional objects, advantages and features of the invention will become apparent to those skilled in the art upon examination of the description or may be learned by practice of the invention. The examples and drawings are provided by way of illustration, and are not intended to be limiting of the present invention.

Wi-Fi is a registered trademark of the Wi-Fi Alliance. Microsoft is a registered trademark of Microsoft Corp, in the United States of America and/or other countries.

Oracle is a registered trademark of Oracle Corporation and/or its subsidiaries.

MySQL is a registered trademark of MySQL AB in the United States of America, European Union and other countries.

The invention claimed is:

1. INTEGRATED SYSTEM FOR MULTICHANNEL MONITORING AND COMMUNICATION IN THE MANAGEMENT OF RESCUE TEAMS, having a modular architecture comprised of: a fire, heat, water and impact proof suit (1); an electronic system (2); a telecommunications system (4); and an information system (3); in which the integrated system: utilizes suits (1) made of fire, water, heat and impact proof materials to protect from fire, water, heat, and impacts, and to monitor the operational units in emergency or catastrophic situations, while safeguarding and facilitating access to the electronic system (2); collects and processes biometric, orientation and operational suited units location data on the terrain, through sensors (130-135), microprocessors (124, 126, 127) and transmitters (125) which integrate the electronic system (2) built into the suits (1); transmits by radiofrequency, in real-time, the biometric, orientation and location data to a remote computer integrated in a support vehicle, which in turn transmits them, via GPRS/GSM or satellite, to a central server, by the telecommunications system (4)— utilizing alternate communication techniques to establish communication in scenarios where either GPRS/GSM or satellite are unavailable; utilizes the information system (3) in an integrated manner with its functions, allowing the coordinative rescue units to simultaneously and in real-time to monitor biometric, orientation and location data, to receive critical alerts and to define deployment strategies for the operational suited units; integrates the main interface of the information system (3) in a wireless mobile device which is held by the coordinating rescue units, allowing said units to manage all the operational suited units and support vehicles, during operations, in which the electronic system (2) integrated in the suit is composed of: biometric sensors (133, 134, 135) which collect heart rate (135), body temperature, torso verticality and the position of the limbs relative to the torso (134); a Global Positioning System with respective antenna (177) and a digital compass (132) with the function of monitoring the location and orientation of the operational suited units; three microprocessors (124, 126, 127) which process the data relayed by the sensors through the integrated cabling system; a radiofrequency modem (125) to transmit in real-time the gathered and processed data; a loudspeaker (49, 172) with the function of relaying sound messages in case of danger or failure of the electronic system (2); and an alarm module which allows the operational suited units to request assistance.

* * * * *